US011946413B2

(12) United States Patent
Wijesinghe et al.

(10) Patent No.: US 11,946,413 B2
(45) Date of Patent: Apr. 2, 2024

(54) INLET BULKHEADS FOR LARGE DIAMETER AIRCRAFT ENGINES

(71) Applicant: The Boeing Company, Chicago, IL (US)

(72) Inventors: Janaka Wijesinghe, Summerville, SC (US); Andrew G. Rocha, Summerville, SC (US); Eric J. Zimney, Summerville, SC (US)

(73) Assignee: The Boeing Company, Arlington, VA (US)

( * ) Notice: Subject to any disclaimer, the term of this patent is extended or adjusted under 35 U.S.C. 154(b) by 493 days.

(21) Appl. No.: 16/525,050

(22) Filed: Jul. 29, 2019

(65) Prior Publication Data

US 2021/0033026 A1 Feb. 4, 2021

(51) Int. Cl.
*F02C 7/04* (2006.01)
*B64C 7/02* (2006.01)
*B64D 29/06* (2006.01)
*F01D 25/24* (2006.01)

(52) U.S. Cl.
CPC .............. *F02C 7/04* (2013.01); *B64C 7/02* (2013.01); *B64D 29/06* (2013.01); *F01D 25/24* (2013.01)

(58) Field of Classification Search
CPC ... B64C 7/02; B64D 29/06; F02C 7/04; F02C 7/05; F02C 7/055
See application file for complete search history.

(56) References Cited

U.S. PATENT DOCUMENTS

| 8,490,920 | B2 * | 7/2013 | Karem | B64C 1/10 244/119 |
| 9,708,072 | B2 * | 7/2017 | Lumbab | F01D 25/005 |
| 9,776,704 | B1 * | 10/2017 | Rufino | B29C 70/384 |
| 2008/0016844 | A1 * | 1/2008 | Shutrump | F02K 3/02 60/226.1 |
| 2010/0068051 | A1 * | 3/2010 | Cloft | F02C 7/04 415/220 |
| 2010/0124494 | A1 * | 5/2010 | Howarth | F02C 7/04 415/213.1 |

(Continued)

FOREIGN PATENT DOCUMENTS

EP 2846023 11/2015
EP 3093240 A1 * 11/2016 ........... F04D 29/526

(Continued)

OTHER PUBLICATIONS

Extended European Search Report and written opinion concerning EP Patent Application No. 20180477.0 dated Nov. 27, 2020.

(Continued)

*Primary Examiner* — Michael H Wang
(74) *Attorney, Agent, or Firm* — Kunzler Bean & Adamson

(57) ABSTRACT

Provided is an inlet bulkhead for large diameter aircraft engines. The inlet bulkhead, in certain examples, includes an annular body having an outer flange, an inner flange, and a web having a first side and an opposing second side. The web extends from the outer flange to the inner flange. The bulkhead also includes at least one annular stiffener disposed on the first side, and multiple radial stiffeners disposed on the first side, each of which extend from the outer flange to the inner flange. The annular and radial stiffeners may be integrally formed with the web.

20 Claims, 11 Drawing Sheets

(56) References Cited

U.S. PATENT DOCUMENTS

| | | | | |
|---|---|---|---|---|
| 2011/0290940 A1* | 12/2011 | Noebel | ..................... | B64C 1/10 |
| | | | | 244/121 |
| 2014/0370227 A1* | 12/2014 | Diep | ..................... | B62D 25/00 |
| | | | | 244/121 |
| 2015/0129045 A1* | 5/2015 | Kane | ......................... | F02C 7/04 |
| | | | | 137/15.1 |
| 2015/0314850 A1* | 11/2015 | Lumbab | .................... | F02C 7/04 |
| | | | | 415/215.1 |
| 2016/0107743 A1* | 4/2016 | Seack | ....................... | B64C 3/22 |
| | | | | 244/119 |
| 2017/0233090 A1* | 8/2017 | Crawford | ................. | F02C 7/04 |
| | | | | 415/220 |
| 2018/0127108 A1* | 5/2018 | Lebeda | ...................... | F02C 7/04 |
| 2018/0297713 A1* | 10/2018 | Schrell | ................... | B64D 33/02 |
| 2019/0127040 A1* | 5/2019 | Heltsch | .................... | B64C 1/10 |
| 2020/0102082 A1* | 4/2020 | Sanz Martinez | ...... | B64D 29/00 |
| 2020/0130856 A1* | 4/2020 | West | ...................... | B64D 29/00 |

FOREIGN PATENT DOCUMENTS

| | | | | |
|---|---|---|---|---|
| WO | WO-9924316 A1 * | 5/1999 | ............... | B64C 1/10 |
| WO | WO-2014170609 A1 * | 10/2014 | ................ | F02C 7/04 |

OTHER PUBLICATIONS

Canadian Office Action for CA Patent Application No. 3083325 dated Aug. 14, 2023.

* cited by examiner

INLET BULKHEADS FOR LARGE DIAMETER AIRCRAFT ENGINES

FIELD

This disclosure relates generally to aircraft engine nacelle, and more particularly to aircraft engine nacelle inlets having at least one bulkhead.

BACKGROUND

Aircraft engines, such as turbo jet engines and turbofan jet engines, are often surrounded by a barrel-shaped nacelle. The nacelle inlet is generally formed with an airfoil shaped exterior wall and an interior wall that defines an inlet opening of the engine. The exterior and interior walls define a cavity between them that houses a forward bulkhead and an aft bulkhead. Very high bypass-ratio jet engines have resulted in large diameter nacelle inlets with higher wetted area that can cause higher reacted internal loads and displacements than smaller diameter counterparts. The forward and aft bulkheads are important structural elements that counteract loads from aerodynamic and cavity pressure, thermal changes, and fan-blade out events during operation of the engine. Current bulkheads utilize thicker structural webs to provide stiffness and strength capable of handling the higher loads and displacements of the very high-bypass ratio engines. However, the added weight can prove a detriment to the overall performance of an aircraft.

SUMMARY

The subject matter of the present application has been developed in response to the present state of the art, and in particular, in response to the shortcomings of conventional bulkheads, that have not yet been fully solved by currently available techniques. Accordingly, the subject matter of the present application has been developed to provide an apparatus, system, and method that overcomes at least some of the above-discussed shortcomings of prior art techniques.

In certain embodiments, the system includes an engine nacelle inlet having an outer barrel, an inner barrel, a forward bulkhead, and an aft bulkhead. The forward bulkhead includes an outer flange coupled to a surface of the outer barrel, an inner flange coupled to a surface of the inner barrel, a web connecting the outer flange to the inner flange, and at least one annular stiffener extending from the web and interposed between the inner flange and the outer flange.

The aft bulkhead, in certain embodiments, includes an outer flange coupled to the surface of the outer barrel, an inner flange coupled to the surface of the inner barrel, a web connecting the outer flange to the inner flange, and at least one annular stiffener extending from the web and interposed between the outer flange and the inner flange. The forward bulkhead may have a ratio of a web height to a web thickness in a range of between about 255 and 380. The web thickness, in certain embodiments, is greater than or equal to 0.0450 inches, and the web height is less than or equal to 17.0 inches.

The aft bulkhead, in certain embodiments, has a ratio of a web height to a web thickness in a range of between about 210 and 410. The web thickness of the aft bulkhead is greater than or equal to 0.0450 inches, and the web height of the aft bulkhead is less than or equal to 20.0 inches. The forward bulkhead, in certain embodiments, also includes radial stiffeners that are integrally formed with the web and extend from the outer flange to the inner flange. In certain embodiments, each radial stiffener intersects at least one annular stiffener.

In certain embodiments, the forward bulkhead includes multiple annular stiffeners, each with a unique diameter. Each of a pair of adjacent radial stiffeners intersects with adjacent annular stiffeners to form a cell that is capable of undergoing elastic compression buckling at all flight loads that do not exceed fatigue loads.

In certain embodiments, the aft bulkhead, like the forward bulkhead, includes multiple radial stiffeners that are integrally formed with the web and that each extend from the outer flange to the inner flange. The radial stiffeners of the aft bulkhead may also intersect at least one annular stiffener. The aft bulkhead, in certain embodiments, includes multiple annular stiffeners, each with a unique diameter. Pairs of radial stiffeners may intersect adjacent annular stiffeners to form a cell that is capable of undergoing elastic compression buckling at all flight loads that do not exceed fatigue loads.

An apparatus of the present disclosure is also described below. In certain embodiments, the apparatus includes an annular body having an outer flange, an inner flange, and a web having a first side and an opposing second side, the web extends from the outer flange to the inner flange. The apparatus also includes at least one annular stiffener disposed on the first side, and multiple radial stiffeners disposed on the first side, each of which extend from the outer flange to the inner flange.

In certain embodiments, the annular stiffener is integrally formed with the web, and each of the radial stiffeners is integrally formed with the web. The apparatus may include multiple annular stiffeners, each with a unique diameter. A pair of adjacent radial stiffeners may intersect a pair of adjacent annular stiffeners to form a cell that is capable of undergoing elastic compression buckling at all flight loads that do not exceed fatigue loads. The apparatus may have a ratio of a web height to a web thickness in a range of between about 210 and 410. The web height, in certain embodiments, is less than or equal to 20.0 inches, and the web thickness is greater than or equal to 0.0450 inches.

The method of the present disclosure includes forming an annular web surface having an inner flange and an outer flange, and forming at least one annular stiffener on a side of the annular web surface. The method also includes forming radial stiffeners on the side of the annular web surface.

The described features, structures, advantages, and/or characteristics of the subject matter of the present disclosure may be combined in any suitable manner in one or more examples and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example or implementation. In other instances, additional features and advantages may be recognized in certain examples and/or implementations that may not be present in all examples or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings depict only typical examples of the subject matter and are not therefore to be considered to be limiting of its scope, the subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples. Like reference numbers signify like elements throughout the description of the figures.

The apparatus and method of this disclosure provide nacelle inlet bulkheads with annular or hoop-like stiffeners that intersect radially extending stiffeners. Each bulkhead is annular in configuration, having an inner diameter formed by an inner flange and an outer diameter formed by an outer flange. The intersections of annular and radial stiffeners define cells therebetween that have a shape of an annular sector (i.e., a sector of a circular ring). A web extends between the annular and radial stiffeners. This arrangement allows for a thinner web thickness (close to minimum manufacturing thickness in some cases) that results in an overall reduced weight of a nacelle inlet while handling operational flight loads, and safely buckling in a controlled manner for a subset of these cases without failure. This arrangement also provides improved damage tolerance capability for fan blade-out and bird strike events, and improved ovalization stiffness for the inlet. The higher ovalization stiffness helps the fancase maintain fan blade tip clearances. The fore-aft stiffness of this arrangement is equivalent to or better than the current state of the art which increases the natural frequency which has benefits in a high vibration environment. These benefits and features will be described in greater detail below.

Figure 1:
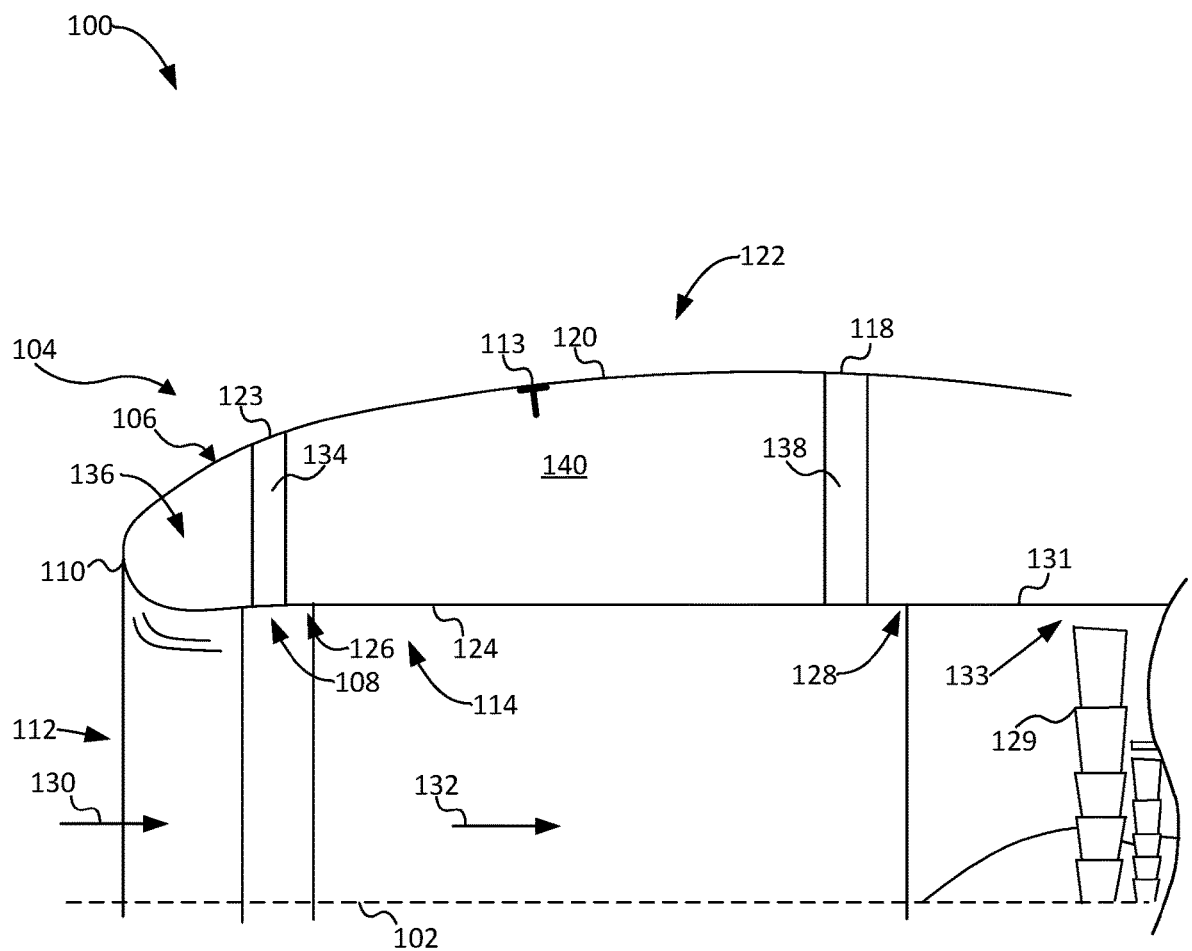
FIG. 1 is a diagram illustrating a partial cross-section view of a nacelle inlet in accordance with examples of the present disclosure.

FIG. 1 is a diagram illustrating a partial cross-section view of a nacelle inlet 100 in accordance with examples of the present disclosure. The nacelle inlet 100 encloses a turbofan engine (partially shown) for use with an aircraft. It is contemplated however, that the disclosure applies equally to nacelles for other types of engines and vehicles. Additionally, the features of the bulkheads described below may be incorporated into other structural components of a vehicle that would benefit from a structural-rigidity-increasing member disposed in a cavity between inner and outer load-receiving surfaces.

In certain examples, the nacelle inlet 100 extends generally circumferentially about a centerline 102. A lipskin assembly 104 includes a lipskin segment 106 that extends from a first lipskin edge 108 to a hilite 110 to define a generally diffuser-shaped inlet 112 of the nacelle inlet 100 while continuing to the second lipskin edge 113. As such, the lipskin segment 106 forms at least a portion of an interior wall positioned on an interior 114 and at least a portion of the exterior wall 122 of the nacelle inlet 100. The lipskin assembly 104 includes an outer barrel segment 120 that extends from the lipskin edge 113 to a second edge 118 to form at least a portion of an exterior wall 122 of the nacelle inlet 100. In alternative examples, the lipskin assembly 104 includes an outer barrel segment 120 that extends from the lipskin edge 123 to a second edge 118. In this alternative example, the lipskin 106 extends from edge 108 to 123.

A radially inner barrel 124 extends from a first inner barrel edge 126, proximate to the first lipskin edge 108, to a second inner barrel edge 128. The inner barrel 124 is disposed proximate an airflow 130 that enters through the inlet 112 and flows generally in a downstream direction 132 when the nacelle inlet 100 is operational. The inner barrel 124 and lipskin assembly 104 are coupled in any suitable fashion that enables the nacelle inlet 100 to function as intended. The inner barrel 124 encircles the fan blades 129 of a turbofan engine, and has a diameter selected to receive a fan case assembly 131. In certain examples, the diameter of the inner barrel 124 is greater than or equal to 100 inches.

In certain examples, a forward bulkhead 134 extends radially between an interior wall, such as proximate the first lipskin edge 108 and the inner barrel edge 126, and an exterior wall, such as the lipskin segment 106. The forward bulkhead 134 extends between the interior and exterior lipskin segment 106 to form a D-duct plenum 136. In alternative examples, where the lipskin and outer barrel edges lie on edge 123, the forward bulkhead 134 may extend between the lipskin edge 108 and inner barrel edge 126 and both the lipskin segment 106 and outer barrel segment 120 at edge 123. The D-duct plenum 136 is an annular plenum extending about the nacelle inlet 100 and is configured to channel a flow of heated air received by an ice prevention system (not shown). The heated air is configured to warm the lipskin assembly 104 sufficiently to prevent the formation of ice crystals on the nacelle inlet 100.

In certain examples, the nacelle inlet 100 includes an aft bulkhead 138 that extends from the inner barrel 124 to the outer barrel 120 and may be disposed proximate the second inner barrel edge 128. The aft bulkhead 138 is spaced from the forward bulkhead 134, axially along the centerline 102, to define a second plenum 140 therebetween that is radially bound by both lipskin 106 and the outer barrel 120 and the inner barrel 124 and in alternative cases only outer barrel 120 and inner barrel 124. Alternatively, the forward bulkhead 134 and the aft bulkhead 138 are positioned in any suitable position that enables the nacelle inlet 100 to function properly.

Figure 2:
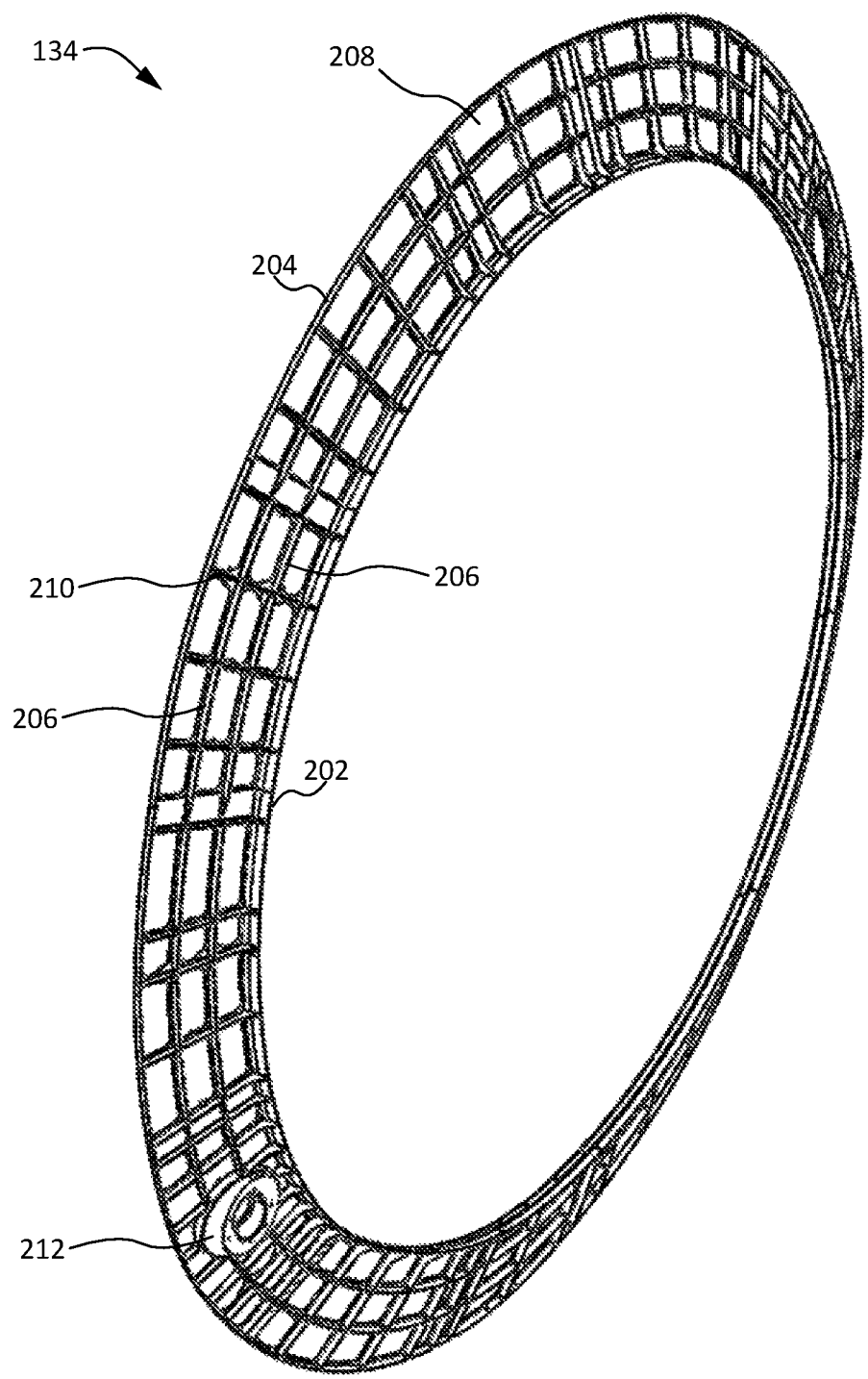
FIG. 2 is a perspective view diagram illustrating the aft side of a forward bulkhead in accordance with examples of the present disclosure.

FIG. 2 is a perspective view diagram illustrating one embodiment of the forward bulkhead 134 in accordance with examples of the present disclosure. The forward bulkhead 134, as described above, forms an annular wall between the D-duct plenum 136 and the second plenum 140. The forward bulkhead 134 includes an inner flange 202 that defines an inner diameter and an outer flange 204 that defines an outer diameter. The inner flange 202 and the outer flange 204 couple to the inner barrel 124 (and/or lipskin segment) at the lipskin edge 108 and lipskin outer segment at the edge 123 (and in alternative cases the outer barrel 120), respectively. The forward bulkhead 134 is configured to operate under tensile, compressive and shear forces and also bending moments, depending on the flight condition. These forces are a result of aerodynamic loads on exterior surfaces 122, pressurization and thermal loading of the D-duct plenum 136 from the ice prevention system, pressurization of the aft bulkhead 138 and the ambient thermal environment.

The forward bulkhead 134, in certain examples, is a monolithic structure. Alternatively, the forward bulkhead 134 may be formed of annular segments, or multiple annular sectors. The forward bulkhead 134, in certain examples, is machined with one or more annular stiffeners 206. Each annular stiffener 206 is formed on a web surface 208 that extends between the inner flange 202 and the outer flange 204. Each annular stiffener 206 may be integrally formed with the web surface 208.

Depending upon the web height (i.e., a radial distance between the inner flange 202 and the outer flange 204), the forward bulkhead may be configured with two annular stiffeners 206, as depicted. Alternatively, the forward bulkhead 134 may be configured with a single annular stiffener 206 or three or more annular stiffeners 206. The annular stiffeners 206 may be equally spaced or biased in the radial direction between the inner flange 202 and the outer flange 204. In certain embodiments, the forward bulkhead 134 is formed with annular stiffeners 206 on the aft-facing surface to allow for a smooth surface for the anti-ice system and blankets.

In certain examples, the forward bulkhead 134 is formed with one or more radial stiffeners 210 that extend radially from the inner flange 202 to the outer flange 204. The radial stiffeners 210 may be formed on the same side of the web surface 208 as the annular stiffeners 206 as depicted. Each radial stiffener 210 may be integrally formed with the web surface 208. As will be described in greater detail below with reference to FIG. 4, the radial stiffeners 210 intersect the annular stiffeners 206 and define cells or bays in the general shape of an annulus sector.

The forward bulkhead 134 may be formed with accessory openings 212 to allow the passage of accessories from the D-duct plenum 136 to/from the second plenum 140. Examples include, but are not limited to, air pathways that carry heated air flow from the ice prevention system.

Figure 3:
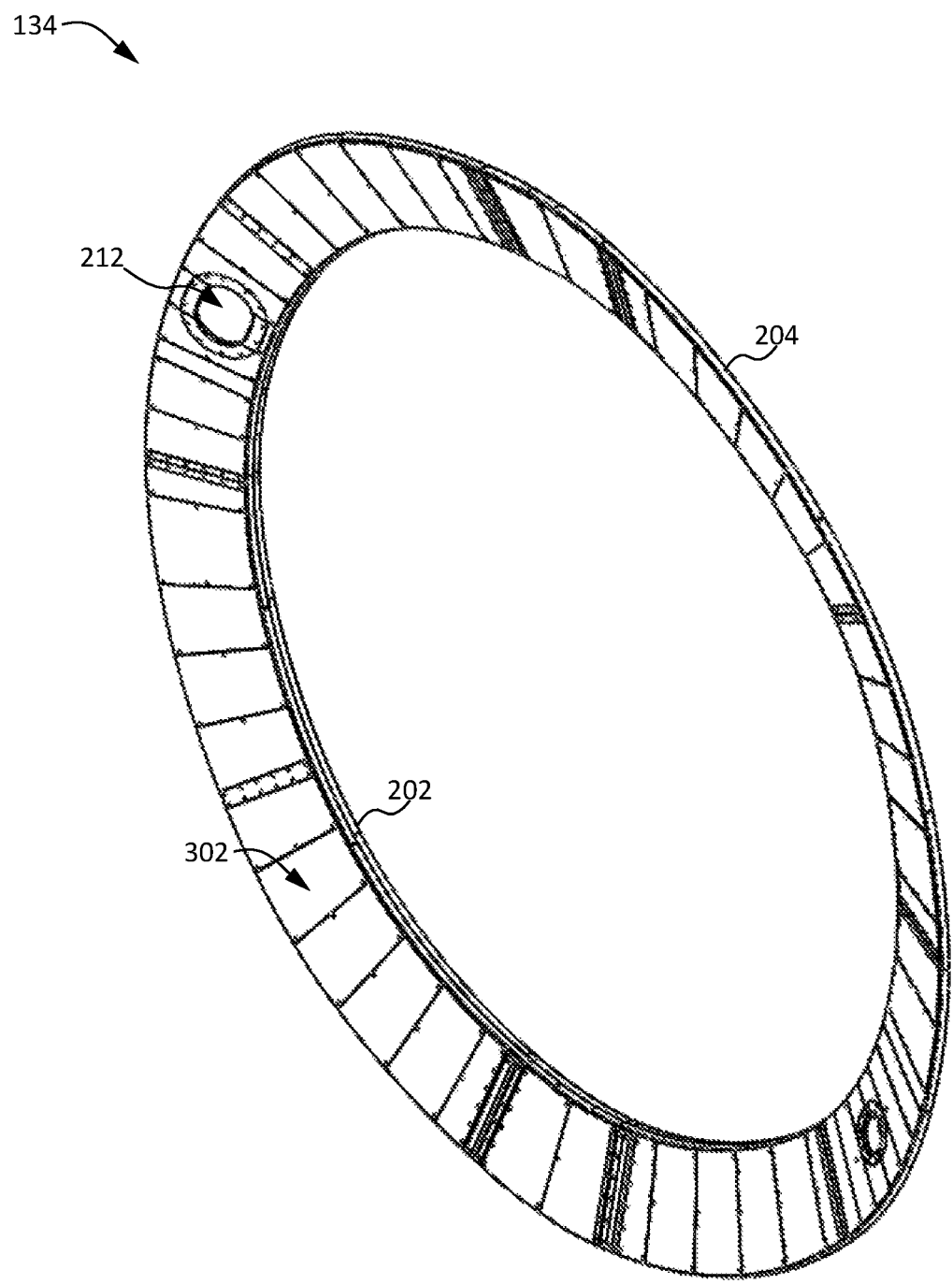
FIG. 3 is another perspective view diagram of the forward side of a forward bulkhead in accordance with examples of the present disclosure.

FIG. 3 is another perspective view diagram of the forward bulkhead 134 in accordance with examples of the present disclosure. The depicted embodiment illustrates an opposite surface of the web 208 than is depicted above with respect to FIG. 2. The forward bulkhead 134, in certain examples, may be oriented such that a smooth web surface 302 is facing the hilite 110 of the lipskin assembly 104 to facilitate smooth flow of the heated air inside the D-duct plenum 136 for the ice prevention system. The forward bulkhead 134 may have a generally conical flat body as depicted, or in the alternative, a substantially planar body or concave body.

During operation, the forward bulkhead 134 is configured to receive an impact load and still be able to maintain residual strength using both the circumferential and radial load paths from the annular and radial stiffeners respectively. In other words, the grid pattern of the stiffeners provides multiple redundant load paths around the locally damaged area. For example, in the event of a bird strike the lipskin can possibly rupture exposing the forward bulkhead to some impact energy. The forward bulkhead 134 is configured to sustain damage and retain residual strength to allow the airplane to land safely. The web surface 208 can rupture while absorbing the force of the impact. The annular stiffeners 206 and the radial stiffeners 210 can behave as crack stoppers to limit widespread damage to maintain the structural rigidity and residual strength of the forward bulkhead 134 post impact event.

Figure 4:
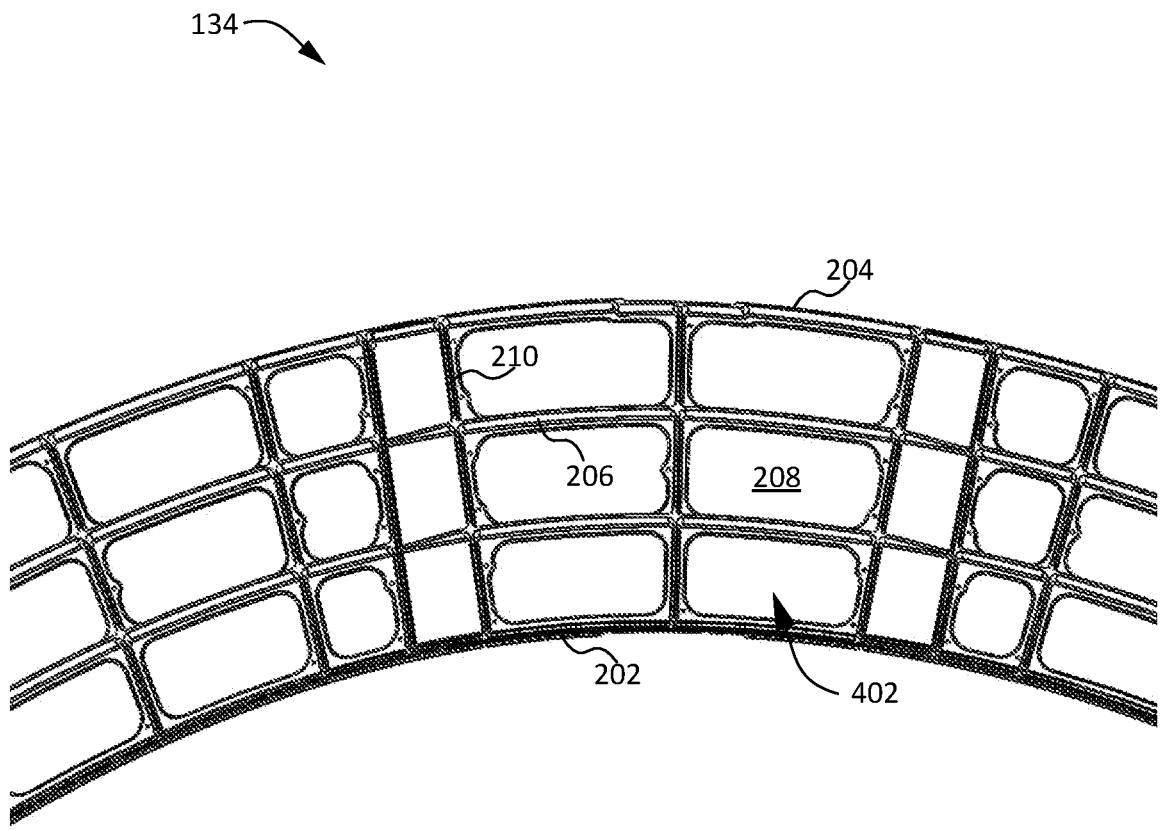
FIG. 4 is a partial normal view diagram illustrating a portion of the aft side of a forward bulkhead in accordance with examples of the present disclosure.

FIG. 4 is a partial normal view diagram illustrating a portion of the aft side of forward bulkhead 134 in accordance with examples of the present disclosure. As described above, the forward bulkhead 134 is formed with one or more annular stiffeners 206 coupled to the web surface 208 close to minimum manufacturing gauge and one or more radial stiffeners 210 that intersect the annular stiffeners 206. The intersections of the annular stiffeners 206 and the radial stiffeners define boundaries of a cell 402 or bay. In certain examples, the cell 402 is formed having a generally annular sector shape. An annular sector, or annulus sector, as known to those of skill in the art, a portion of an annulus formed by two lines extending radially from a center of the annulus. In this example, the cell 402 is defined by a pair of adjacent radially extending stiffeners 210 and either adjacent annular stiffeners 206 or an annular stiffener 206 and an adjacent flange (e.g., inner flange 202 or outer flange 204). Cells 402 are designed close to minimum manufacturing gauge as possible by tailoring the bay size which dictates buckling behavior.

The cells 402 are configured to undergo compression buckling under a pre-determined load, and return to their pre-buckled shape (elastic buckling), as depicted. Loads that may cause an elastic compression buckling event include all flight loads that do not exceed fatigue loads (i.e., flight load levels encountered once every two flights where the ice prevention system is switched off).

Figure 5:
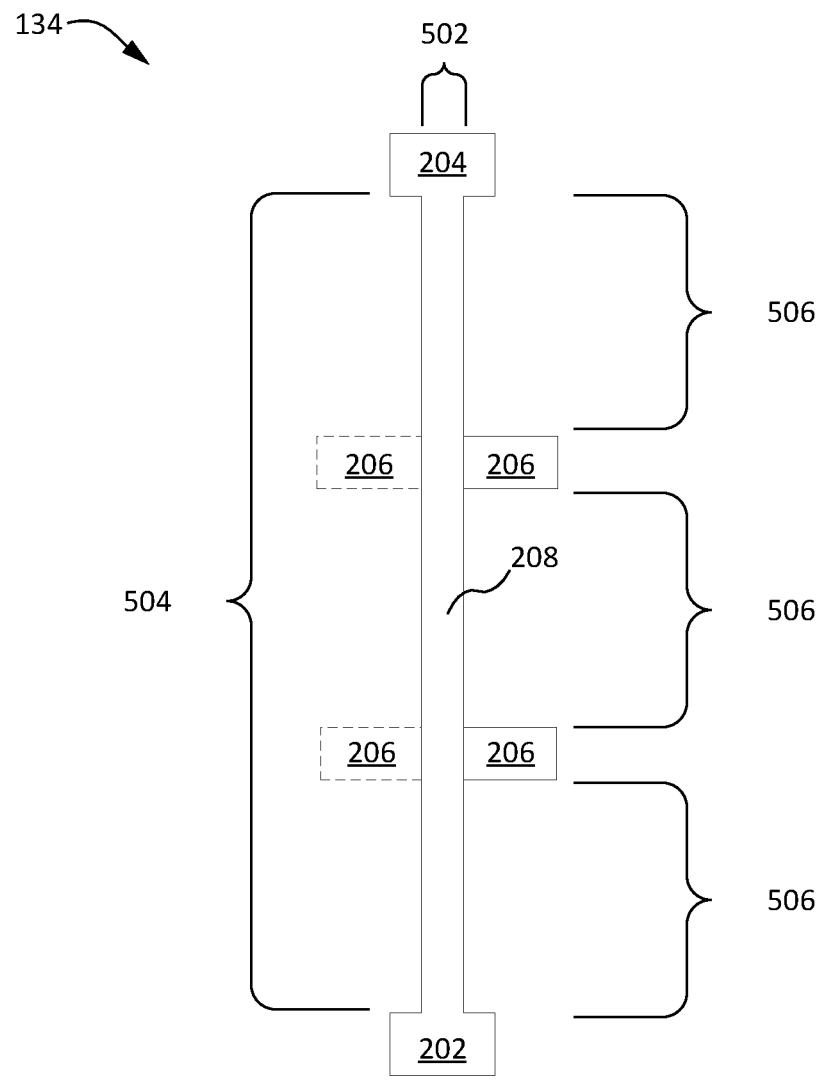
FIG. 5 is a cross-sectional diagram illustrating the important features of a forward bulkhead in accordance with examples of the present disclosure.

FIG. 5 is a cross-sectional diagram illustrating another embodiment of the forward bulkhead 134 in accordance with examples of the present disclosure. The depicted embodiment illustrates an upper half of the cross-sectional diagram, as illustrated in FIG. 1. The forward bulkhead 134, as described above, is formed with the inner flange 202, the outer flange 204, and the web 208 that couples the inner flange 202 to the outer flange 204. The cross-sectional diagram of the aft bulkhead 138 similarly includes the inner flange, outer flange, and the web that couples the flanges. However, the aft bulkhead 138 may include stiffeners (radial and/or annular) on both sides of the web, as depicted by the stiffeners 206 with dashed lines.

Disposed on a surface of the web 208 is one or more annular stiffeners 206. Radial stiffeners 210 are not shown here. The web 208, in certain examples, has a thickness 502 in the range of between about 0.030 and 0.055. In further embodiments, the web 208 has a thickness 502 in the range of between about 0.045 and 0.050. Although depicted with a uniform thickness 502, the thickness may increase or decrease along the web height 504 from the outer flange 204 to the inner flange 202.

A cell height 506, or radial distance between adjacent annular stiffeners 206, may be substantially uniform across all cells 402 of the forward and/or aft bulkhead. Alternatively, the spacing between annular stiffeners 206 may vary. Although depicted in a general I-beam configuration, many other configurations are contemplated, including, but not limited to those depicted above with reference to FIGS. 1-4. The discussion of web and cell height and thickness applies generally to the aft bulkhead 138, which is described in greater detail below with reference to FIGS. 6-8.

Figure 6:
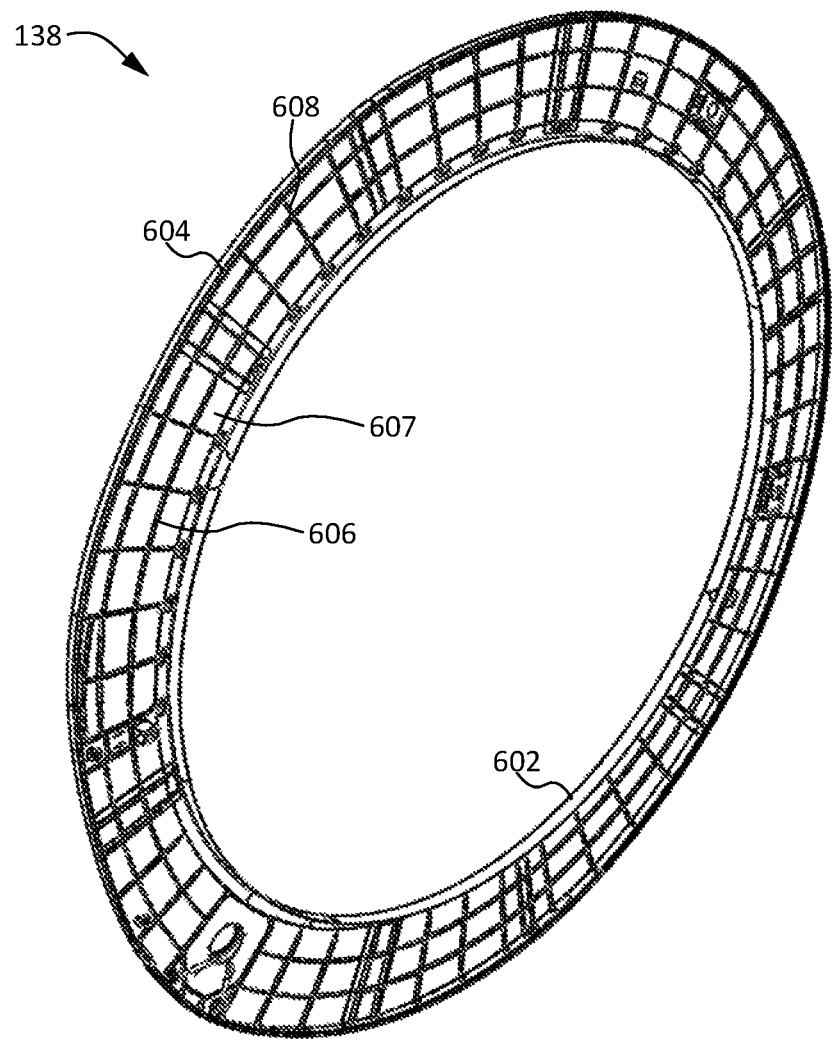
FIG. 6 is a perspective view diagram illustrating the aft side of an aft bulkhead in accordance with examples of the present disclosure.

FIG. 6 is a perspective view diagram illustrating one embodiment of the aft bulkhead 138 in accordance with examples of the present disclosure. The aft bulkhead 138 is an annular barrier extending outward from the inner barrel 124 of the nacelle inlet 100 to the outer barrel 120. The aft bulkhead 138, in a manner similar to the forward bulkhead 134, is formed with an inner flange 602 and an outer flange 604. The inner flange 602 couples to and engages the aft bulkhead 138 with the inner barrel 124. The outer flange 604 couples to and engages the aft bulkhead 138 with the outer barrel 120 of the nacelle inlet 100.

The aft bulkhead 138, in certain examples, is a monolithic structure. Alternatively, the aft bulkhead 138 may be formed of annular segments (i.e., multiple concentric rings of increasing diameter to form the bulkhead 138), or multiple annular sectors. The aft bulkhead 138, in certain examples, is formed with one or more annular stiffeners 606. Each annular stiffener 606 is formed on a web surface 607 that extends between the inner flange 602 and the outer flange 604. In certain embodiments, each annular stiffener 606 is integrally formed with the web surface 607.

Depending upon the web height (i.e., a radial distance between the inner flange 602 and the outer flange 604), the aft bulkhead 138 may be configured with two annular stiffeners 606, as depicted. Alternatively, the aft bulkhead 138 may be configured with a single annular stiffener 606 or three or more annular stiffeners 606. The annular stiffeners 606 may be equally spaced between the inner flange 602 and the outer flange 604. Stated differently, the annulus regions formed between the annular stiffeners 606 and the annulus regions formed between either the inner or outer flange 602, 604 and one of the annular stiffeners 606 each have a substantially equivalent radial height.

In certain examples, the aft bulkhead 138 is formed with one or more radial stiffeners 608 that extend radially from the inner flange 602 to the outer flange 604. The radial stiffeners 608 may be formed on the same side of the web surface 607 as the annular stiffeners 606 as depicted. Each radial stiffener 608 may be integrally formed on the web surface 607. Alternatively, the radial stiffeners 608 and/or annular stiffeners 606 may be formed on an opposite surface of the web 607 stiffeners.

Figure 7:
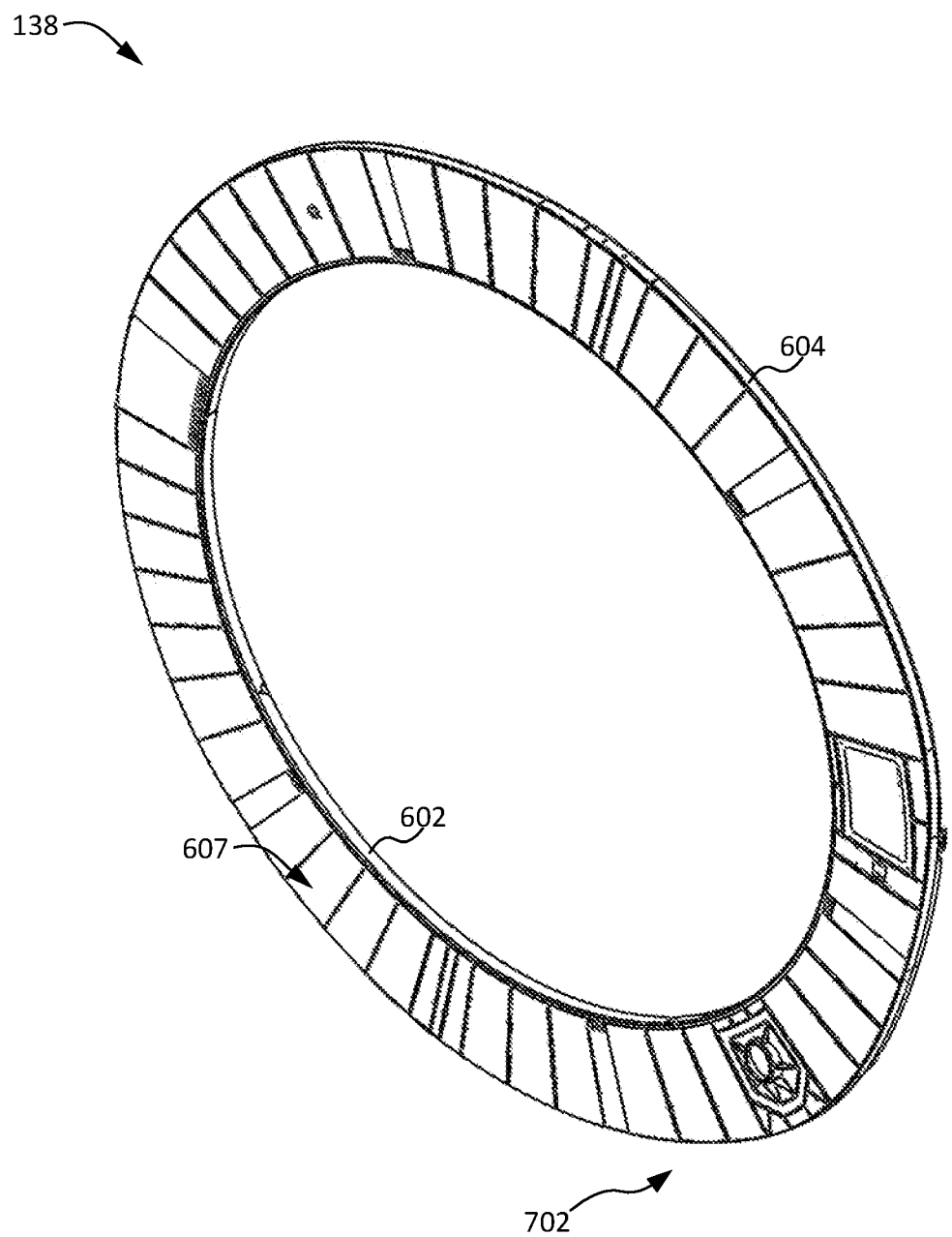
FIG. 7 is another perspective view diagram of the forward side of an aft bulkhead in accordance with examples of the present disclosure.

FIG. 7 is another perspective view diagram of the aft bulkhead 138 in accordance with examples of the present disclosure. The depicted embodiment illustrates an opposite surface of the web 607 than is depicted above with respect to FIG. 6. The aft bulkhead 138, in certain examples, may be oriented such that a smooth web surface 302 is facing the hilite 110 of the lipskin assembly 104. The aft bulkhead 138 may have a generally planar body as depicted, or in the alternative, a substantially concave or conical flat body. Like the forward bulkhead 134, the aft bulkhead 138 may be provided with accessory openings 702 to allow the passage of accessories, such as a heated-air pathway, for example.

During operation, the aft bulkhead 138 is configured to receive an impact load and incur some local damage and still be able to maintain residual strength using both the circumferential and radial load paths from the annular and radial stiffeners respectively. In other words, the grid pattern of the stiffeners provides multiple redundant load paths around the locally damaged area. For example, in the event of a fan-blade out event, the aft bulkhead 138 is configured to t receive a load from the fan case 131, through the inner barrel 124 and inner flange 602 into the aft bulkhead 138. The aft bulkhead 138 will incur plastic strains and possibly locally rupture but the annular stiffeners 606 and the radial stiffeners 608 maintain the structural rigidity and residual strength of the aft bulkhead 138 post impact event.

Figure 8:
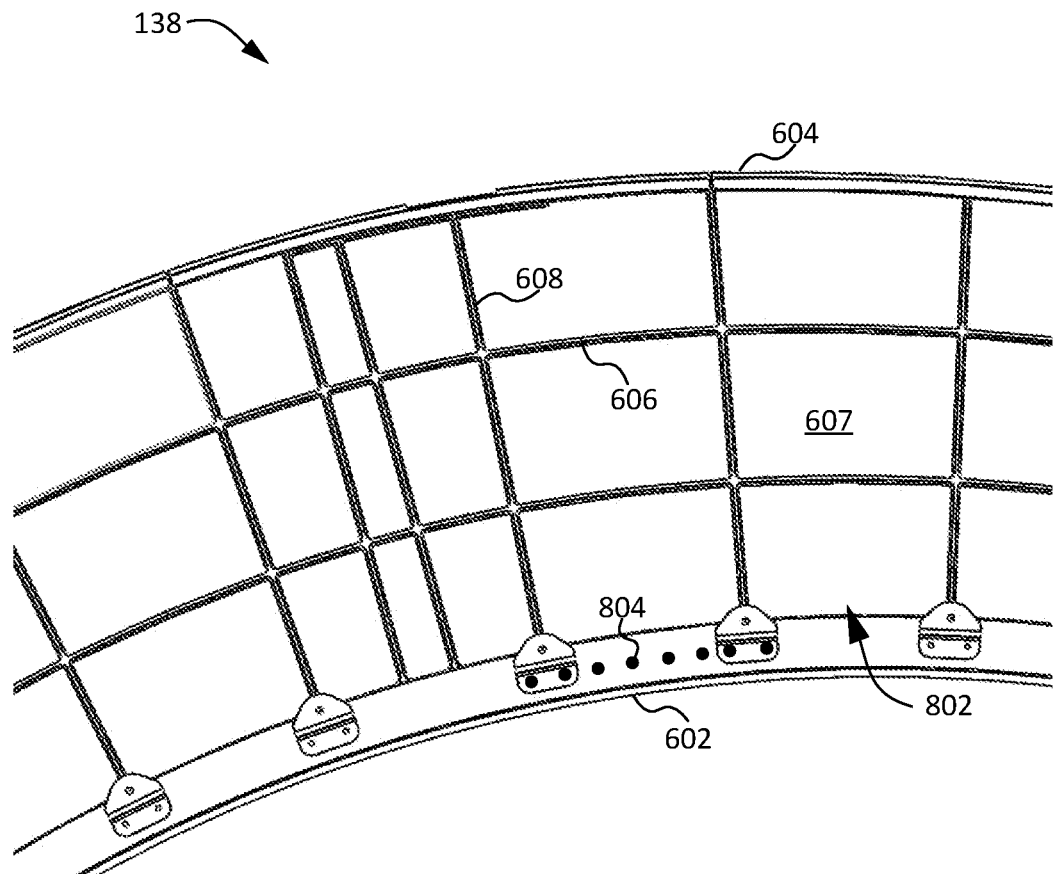
FIG. 8 is a partial normal view diagram illustrating a portion of the aft bulkhead in accordance with examples of the present disclosure.

FIG. 8 is a partial normal view diagram illustrating an aft portion of the aft bulkhead 138 in accordance with examples of the present disclosure. As described above, the aft bulkhead 138 is formed with one or more annular stiffeners 606 coupled to the web surface 607 and one or more radial stiffeners 608 that intersect the annular stiffeners 606. The intersections of the annular stiffeners 606 and the radial stiffeners 608 define boundaries of a cell 802 or bay. In certain examples, the cell 802 is formed having a generally annular sector shape. An annular sector, or annulus sector, as known to those of skill in the art, is a portion of an annulus formed by two lines extending radially from a center of the annulus. In this example, the cell 802 is defined by a pair of adjacent radially extending stiffeners 608 and either adjacent annular stiffeners 606 or an annular stiffener 606 and an adjacent flange (e.g., inner flange 602 or outer flange 604).

The cells 802 are configured to undergo compression buckling under a pre-determined load and return to their pre-buckled shape (elastic buckling), as depicted. Loads that may cause an elastic compression buckling event include all flight loads except for flight loads levels encountered once every two flights (i.e., fatigue loads) where the ice prevention system is switched off.

In certain examples, the inner flange 602 and the outer flange 603 of the aft bulkhead 138 (or the forward bulkhead 134) may be formed separately from the web surface 607 and coupled to either the inner flange 602 or the outer flange 604 via fasteners 804.

The stiffeners also provide stiffness against ovalization of the nacelle inlet to aid the fan case 131 in maintaining fan blade 129 tip clearances 133. The stiffeners also provide stiffness to increases the natural frequency of the inlet which can produce some benefits in a high vibration environment.

Figure 9:
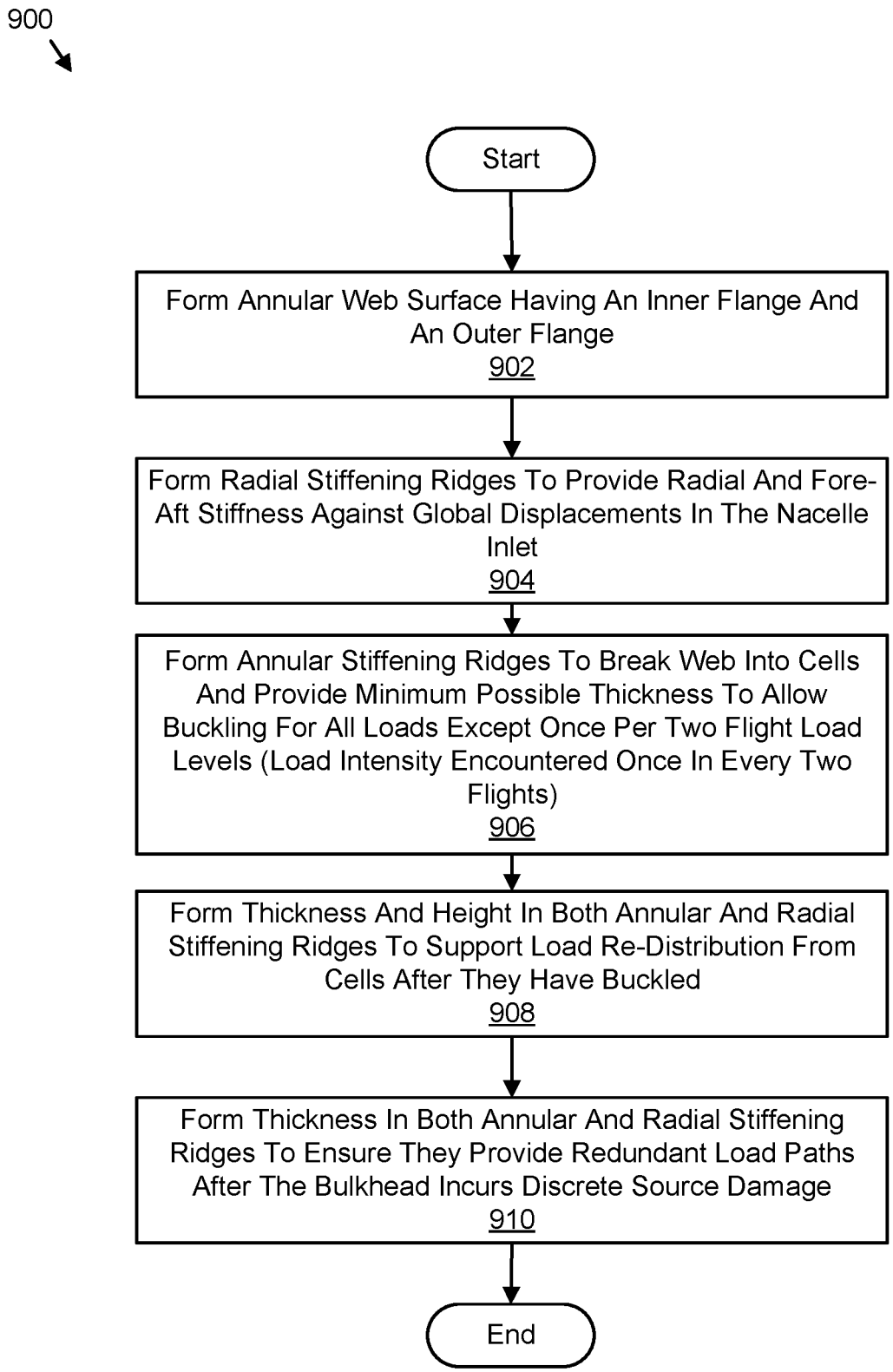
FIG. 9 is a flowchart diagram illustrating a method for providing either a forward bulkhead or an aft bulkhead in accordance with examples of the present disclosure.

FIG. 9 is a flowchart diagram illustrating one example of a method 900 for forming either a forward bulkhead or an aft bulkhead in accordance with examples of the present disclosure. The method 900 begins and, at block 902, an annular web surface is formed having an inner flange for engaging an inner barrel surface of a nacelle inlet and an outer flange for engaging an outer barrel surface of a nacelle inlet. At block 904, at least one radial stiffener is formed on (e.g., co-formed with or coupled to) the side of the web surface to provide radial and fore-aft stiffness against global displacements in the nacelle inlet. At block 906, at least one annular stiffener is formed on (e.g., co-formed with or coupled to) at least one side of the web surface. The radial stiffeners may be formed to intersect the annular stiffener to form multiple cells capable of buckling under a compressive load for all cases expect flight loads levels encountered once every two flights (i.e., fatigue loads) where the ice prevention system is switched off.

At block 908, additional thickness and height in both annular and radial stiffeners is formed to support load re-distribution from cells after they have buckled. At block 910 additional thickness and height in both annular and radial stiffeners is formed to ensure they provide redundant load paths after the bulkhead incurs discrete source damage.

Figure 10:
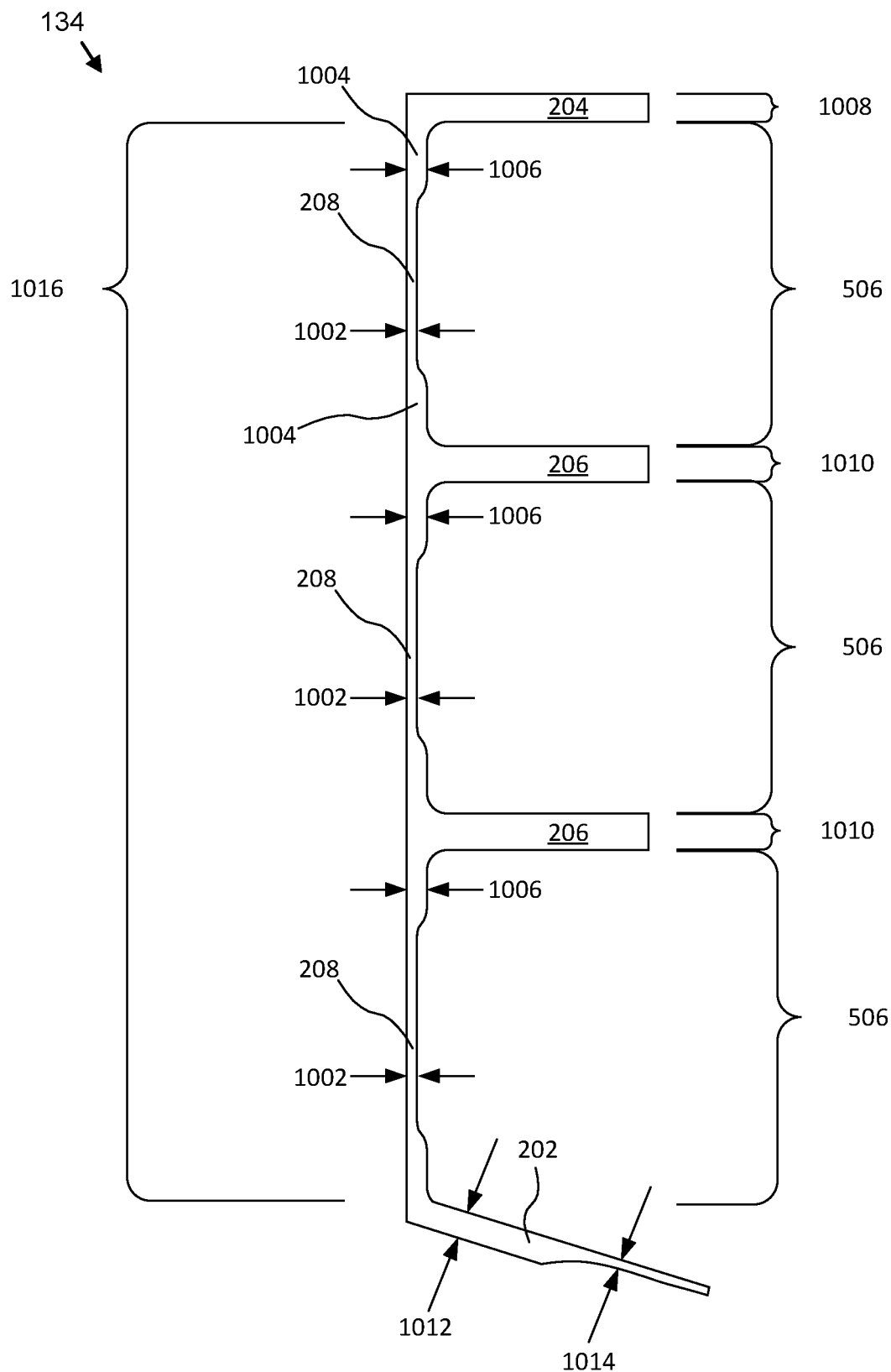
FIG. 10 is a cross-sectional diagram illustrating another embodiment of the forward bulkhead in accordance with examples of the present disclosure.

FIG. 10 is a cross-sectional diagram illustrating another embodiment of the forward bulkhead 134 in accordance with examples of the present disclosure. The depicted embodiment (which is not to scale) illustrates an upper half of the cross-sectional diagram, as illustrated in FIG. 1. The forward bulkhead 134, as described above, is formed with the inner flange 202, the outer flange 204, and the web 208 that couples the inner flange 202 to the outer flange 204. Formed on a surface of the web 208 is one or more annular stiffeners 206. Radial stiffeners 210 are not shown here. The web 208, in certain examples, has a thickness 1002 in the range of between about 0.030 and 0.065 inches. In other embodiments, the web 208 has a thickness 1002 in the range of between about 0.0450 and 0.0550 in. In certain embodiments, the thickness 1002 of the web 208 is uniform across all cells 402. In other embodiments, the thickness 1002 varies, and may increase from the outer flange 204 to the inner flange 202. In other words, the thickness 1002 of the web 208 near the outer flange 204 is less than the thickness 1002 of the web 208 near the inner flange 202.

In certain embodiments, transition zones 1004 may be provided adjacent features (i.e., inner flange 202, outer flange 204, annular stiffener 206, radial stiffener 210) that extend outward from the web 208. The transition zones 1004 provide increased thickness in areas adjacent the features. This beneficially added thickness of the transition zones helps avoid sonic fatigue issues while maintaining a reduced overall weight of the forward bulkhead 134. A transition zone thickness 1006 may be in the range of between about 0.100 and 0.148 inches. In another embodiment, the transition zone thickness 1006 may be in the range of between about 0.110 and 0.138 inches.

The forward bulkhead 134, in certain embodiments, has an outer flange thickness 1008 in the range of between about 0.090 and 0.120 inches. In another embodiment, the outer flange thickness 1008 is in the range of between about 0.100 and 0.110 inches, and may be about 0.102 inches. An annular stiffener thickness 1010 may be in the range of between about 0.130 and 0.160 inches, and in other embodiments may be in the range of between about 0.149 and 0.150 inches. In another embodiment, the annular stiffener thickness 1010 may be in the range of between about 0.148 and 0.150 inches. The inner flange 202 may be provided with a thickness 1012 that is greater adjacent the web 208 than a thickness 1014 of an end of the inner flange 202. In some embodiments, the thickness 1012 is about 0.408 inches, and the thickness 1014 is about 0.160 inches.

Also depicted here is the cell height 506, as described above with reference to FIG. 5. The cell height 506, or radial distance between adjacent annular stiffeners 206, may be substantially uniform across all cells 402 of the forward and/or aft bulkhead. Alternatively, the spacing between annular stiffeners 206 may vary. In some embodiments, the cell height 506 is in the range of between about 4.50 and 5.50 inches. In other embodiments, the cell height 506 is in the range of between about 4.80 and 5.20 inches. In yet other embodiments, the cell height 506 may be in the range of between about 4.83 and 5.13 inches. A cell width (i.e., an arcuate distance between radial stiffeners) may be in the range of between about 8.20 and 9.90 inches, and in other embodiments in the range of between about 8.35 and 9.82 inches. The radial stiffeners (not shown here) may have a thickness of in the range of between about 0.140 and 0.160 inches, and in another embodiment, have a thickness of about 0.150 inch.

A web height 1016 is defined as the radial distance between the inner flange 202 and the outer flange 204. The web height 1016 may also be defined as the sum of cell heights 506 and annular stiffener thicknesses 1010. In certain embodiments, the forward bulkhead 134 is provided with a web height 1016 in the range of between about 13.0 and 17.0 inches. In other embodiments, the web height 1016 is in the range of between about 14.0 and 16.0 inches. In other embodiments, the web height 1016 is in the range of between about 15.2 and 15.5 inches, and may be about 15.4 inches. The forward bulkhead 134 can have a web height 1016 to web thickness 1002 ratio in a range of between about 255 and 380. The forward bulkhead 134 web thickness 1002 can be as low as 0.045 inches, and the web height 1016 can be as high as 17.0 inches.

Figure 11:
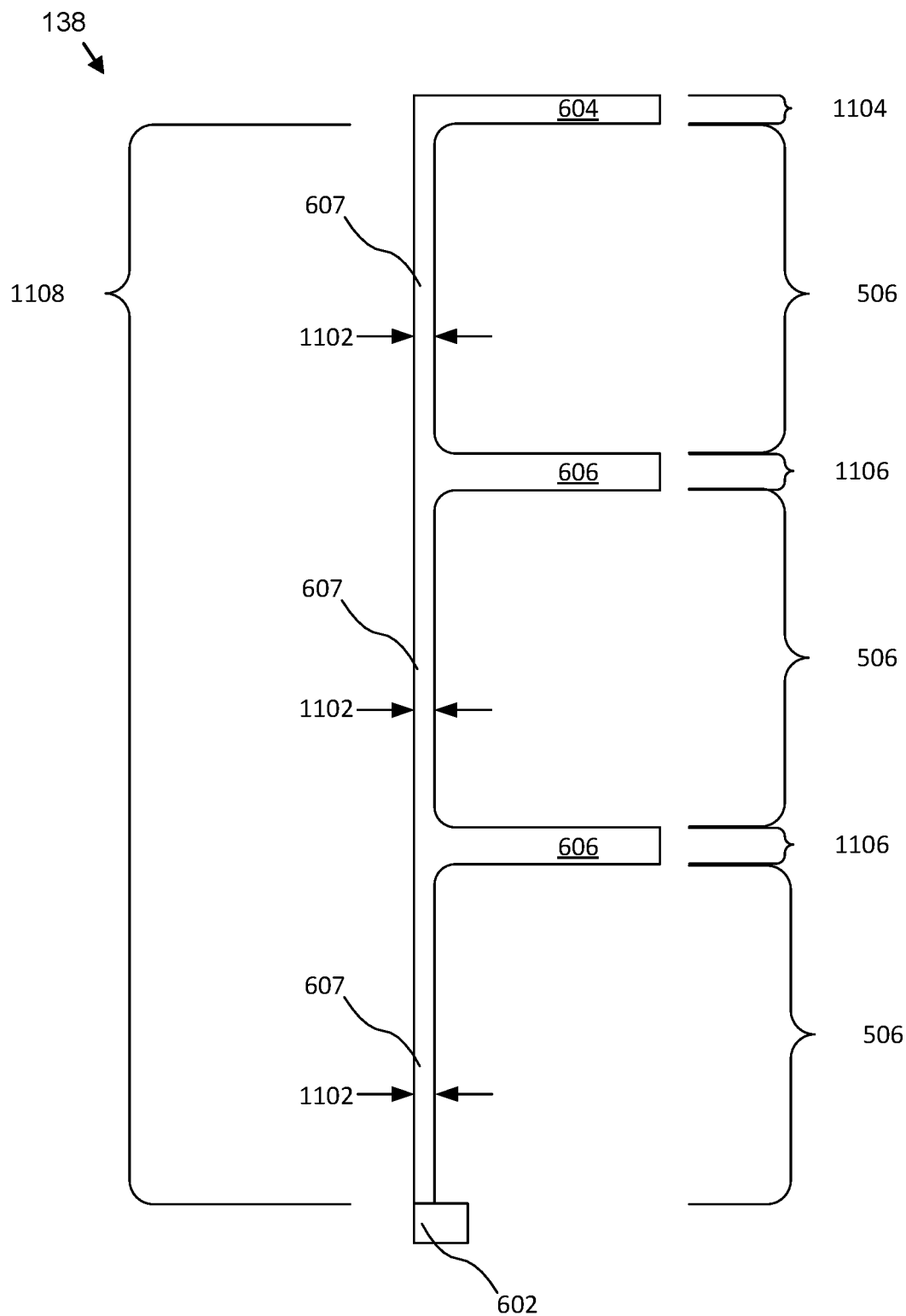
FIG. 11 is a cross-sectional diagram illustrating another embodiment of the aft bulkhead in accordance with examples of the present disclosure.

FIG. 11 is a cross-sectional diagram illustrating another embodiment of the aft bulkhead 138 in accordance with examples of the present disclosure. The depicted embodiment (which is not to scale) illustrates an upper half of the cross-sectional diagram, as illustrated in FIG. 1. The aft bulkhead 138, as described above, is formed with the inner flange 602, the outer flange 604, and the web 607 that couples the inner flange 202 to the outer flange 204. Formed on a surface of the web 607 is one or more annular stiffeners 606. Radial stiffeners 608 are not shown here. The web 607, in certain examples, has a thickness 1102 in the range of between about 0.030 and 0.065 inches, or in the range of between about 0.045 and 0.050. In other embodiments, the web 208 has a thickness 1102 in the range of between about 0.050 and 0.130 inches. In other embodiments, the web thickness 1102 is in the range of between about 0.070 and 0.110 inches. In certain embodiments, the thickness 1102 of the web 607 is uniform across all cells 402. In other embodiments, the thickness 1102 varies, and may increase from the outer flange 604 to the inner flange 602. In other words, the thickness 1102 of the web 607 near the outer flange 604 is less than the thickness 1102 of the web 607 near the inner flange 602.

The aft bulkhead 138, in certain embodiments, has an outer flange thickness 1104 in the range of between about 0.090 and 0.120 inches. In another embodiment, the outer flange thickness 1104 is in the range of between about 0.095 and 0.105 inches, and may be about 0.010 inches. An annular stiffener thickness 1106 may be in the range of between about 0.130 and 0.160 inches, and in other embodiments may be in the range of between about 0.148 and 0.151 inches. In another embodiment, the annular stiffener thickness 1106 may be in the range of between about 0.148 and 0.151 inches.

Also depicted here is the cell height 506, as described above with reference to FIG. 5. The cell height 506, or radial distance between adjacent annular stiffeners 606 or inner/outer flanges, and may be substantially uniform across all cells 402 of the forward and/or aft bulkhead. Alternatively, the spacing between annular stiffeners 206 may vary. In some embodiments, the cell height 506 is in the range of between about 4.50 and 6.50 inches. In other embodiments, the cell height 506 is in the range of between about 5.50 and 6.20 inches. In yet other embodiments, the cell height 506 may be in the range of between about 5.50 and 6.13 inches. A cell width (i.e., an arcuate distance between radial stiffeners) may be in the range of between about 8.20 and 10.2 inches, and in other embodiments in the range of between about 8.30 and 10.1 inches. The radial stiffeners (not shown here) may have a thickness of in the range of between about 0.140 and 0.160 inches, and in another embodiment, have a thickness of about 0.150 inch.

The web height 1108 is defined as the radial distance between the inner flange 602 and the outer flange 604. The web height 1108 may also be defined as the sum of cell heights 506 and annular stiffener thicknesses 1106. In certain embodiments, the aft bulkhead 138 is provided with a web height 1108 in the range of between about 14.0 and 19.0 inches. In other embodiments, the web height 1108 is in the range of between about 14 and 18 inches. In other embodiments, the web height 1108 is in the range of between about 17.6 and 17.9 inches, and may be about 17.8 inches. The aft bulkhead 138 can have a web height 1108 to web thickness 1102 ratio in a range of between about 210 and 410. The aft bulkhead web thickness 1102 can be as low as 0.045, and the web height 1108 is as high as 20.0 inches.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. An engine nacelle inlet comprising:
   an outer barrel;
   an inner barrel;
   a forward bulkhead having:
      an outer flange coupled to a surface of the outer barrel;
      an inner flange coupled to a surface of the inner barrel;
      a single web extending in a flat plane and connecting the outer flange of the forward bulkhead to the inner flange of the forward bulkhead;
      at least one annular stiffener comprising a fixed end, fixed directly to an aft-facing outer surface of the single web of the forward bulkhead and a free end opposite the fixed end, the at least one annular stiffener of the forward bulkhead extending outwardly from the aft-facing outer surface of the single web to the free end and interposed between the inner flange and the outer flange of the forward bulkhead; and
      a plurality of radial stiffeners, where each one of the plurality of radial stiffeners comprises a fixed end, fixed directly to the aft-facing outer surface of the single web, and a free end opposite the fixed end of the corresponding radial stiffener, and each one of the plurality of radial stiffeners extends in a straight line radially across an entirety of a web height from the aft-facing outer surface of the single web to the free end of the corresponding radial stiffener, the web height equal to a radial distance from the inner flange to the outer flange; and
   an aft bulkhead having:
      an outer flange coupled to the surface of the outer barrel;
      an inner flange coupled to the surface of the inner barrel;
      a single web extending in a flat plane and connecting the outer flange of the aft bulkhead to the inner flange of the aft bulkhead;
      at least one annular stiffener comprising a fixed end, fixed directly to an outer surface of the single web of the aft bulkhead and a free end opposite the fixed end of the at least one annular stiffener of the aft bulkhead, the at least one annular stiffener of the aft bulkhead extending outwardly from the outer surface of the single web of the aft bulkhead to the free end of the at least one annular stiffener of the aft bulkhead and interposed between the outer flange and the inner flange of the aft bulkhead; and
      a plurality of radial stiffeners, where each one of the plurality of radial stiffeners of the aft bulkhead comprises a fixed end, fixed directly to the outer surface of the single web, and a free end opposite the fixed end of the corresponding radial stiffener, and each one of the plurality of radial stiffeners of the aft bulkhead extends in a straight line radially across an entirety of a web height from the outer surface of the single web of the aft bulkhead to the free end of the corresponding radial stiffener, the web height equal to a radial distance from the inner flange to the outer flange of the aft bulkhead.

2. The engine nacelle inlet of claim 1, where the forward bulkhead has a ratio of the web height to a web thickness in a range of between about 255 and 380.

3. The engine nacelle inlet of claim 2, where the web thickness is greater than or equal to 0.0450 inches, and the web height is less than or equal to 17.0 inches.

4. The engine nacelle inlet of claim 1, where the aft bulkhead has a ratio of a web height to a web thickness in a range of between about 210 and 410.

5. The engine nacelle inlet of claim 4, where the web thickness is greater than or equal to 0.0450 inches, and the web height is less than or equal to 20.0 inches.

6. The engine nacelle inlet of claim 1, where the plurality of radial stiffeners of the forward bulkhead are integrally formed with the single web of the forward bulkhead.

7. The engine nacelle inlet of claim 1, where each of the plurality of radial stiffeners of the forward bulkhead intersects the at least one annular stiffener of the forward bulkhead.

8. The engine nacelle inlet of claim 7, where the at least one annular stiffener of the forward bulkhead is a first annular stiffener with a first diameter, and the forward bulkhead further comprising a second annular stiffener with a second diameter different than the first diameter.

9. The engine nacelle inlet of claim 8, where each of a pair of adjacent radial stiffeners of the forward bulkhead intersects the first annular stiffener and the second annular stiffener of the forward bulkhead to form a cell that is capable of undergoing elastic compression buckling at all flight loads that do not exceed fatigue loads.

10. The engine nacelle inlet of claim 1, where the plurality of radial stiffeners of the aft bulkhead are integrally formed with the single web of the aft bulkhead.

11. The engine nacelle inlet of claim 1, where each of the plurality of radial stiffeners of the aft bulkhead intersects the at least one annular stiffener of the aft bulkhead.

12. The engine nacelle inlet of claim 11, where the at least one annular stiffener of the aft bulkhead is a first annular stiffener with a first diameter, and the aft bulkhead further comprises a second annular stiffener with a second diameter that is different than the first diameter.

13. The engine nacelle inlet of claim 12, where each of a pair of adjacent radial stiffeners of the aft bulkhead intersects the first annular stiffener and the second annular stiffener of the aft bulkhead to form an open cell that is capable of undergoing elastic compression buckling at all flight loads that do not exceed fatigue loads.

14. A bulkhead for a nacelle inlet of an aircraft engine, the bulkhead comprising:
   an annular body extending in a flat plane and having an outer flange and an inner flange, and a single web having a first side and an opposing second side, the single web extending from the outer flange to the inner flange;
   at least one annular stiffener disposed on the first side of the single web, comprising a fixed end, fixed directly to the first side, and a free end opposite the first end, the at least one annular stiffener extending from the first side of the single web to the free end; and
   a plurality of radial stiffeners disposed on the first side of the single web and each comprising a fixed end, fixed directly to the first side of the single web, and a free end opposite the fixed end of the corresponding radial stiffener, and each one of the plurality of radial stiffeners extends from the first side of the single web to the free end of the corresponding radial stiffener, where each one of the plurality of radial stiffeners extends in a straight line radially across an entirety of a web height of the first side of the single web, the web height equal to a radial distance from the outer flange to the inner flange.

15. The bulkhead of claim 14, where the at least one annular stiffener is integrally formed with the single web, and each of the plurality of radial stiffeners is integrally formed with the single web.

16. The bulkhead of claim 14, where the at least one annular stiffener is a first annular stiffener with a first diameter, and further comprising a second annular stiffener with a second diameter.

17. The bulkhead of claim 16, where each of a pair of adjacent radial stiffeners intersects the first annular stiffener and the second annular stiffener to form an open cell that is capable of undergoing elastic compression buckling at all flight loads that do not exceed fatigue loads.

18. The bulkhead of claim 14, further comprising a ratio of the web height to a web thickness in a range of between about 210 and 410.

19. The bulkhead of claim 18, where the web height is less than or equal to 20.0 inches, and the web thickness is greater than or equal to 0.0450 inches.

20. A method of forming a bulkhead for a nacelle of an aircraft engine, the method comprising:

forming a single annular web surface extending in a flat plane and having an inner flange and an outer flange;

forming at least one annular stiffener on a side of the single annular web surface and extending from the side of the single annular web surface to a free end; and forming a plurality of radial stiffeners on the side of the single annular web surface where each one of the plurality of radial stiffeners extend from the side of the single annular web surface to a free end, and where each one of the plurality of radial stiffeners extends in a straight line radially across an entirety of a web height of the single annular web surface, the web height equal to a radial distance from the outer flange to the inner flange.

* * * * *